United States Patent
Kwak et al.

(10) Patent No.: US 11,096,163 B2
(45) Date of Patent: Aug. 17, 2021

(54) METHOD FOR RECEIVING DOWNLINK CONTROL CHANNEL AND DEVICE THEREFOR

(71) Applicant: LG ELECTRONICS INC., Seoul (KR)

(72) Inventors: Kyuhwan Kwak, Seoul (KR); Seungmin Lee, Seoul (KR); Inkwon Seo, Seoul (KR); Yunjung Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 83 days.

(21) Appl. No.: 16/621,687

(22) PCT Filed: Jun. 11, 2018

(86) PCT No.: PCT/KR2018/006589
§ 371 (c)(1),
(2) Date: Dec. 11, 2019

(87) PCT Pub. No.: WO2018/230902
PCT Pub. Date: Dec. 20, 2018

(65) Prior Publication Data
US 2020/0196283 A1 Jun. 18, 2020

Related U.S. Application Data

(60) Provisional application No. 62/519,102, filed on Jun. 13, 2017.

(51) Int. Cl.
*H04W 72/04* (2009.01)
*H04L 1/06* (2006.01)
(Continued)

(52) U.S. Cl.
CPC ......... *H04W 72/042* (2013.01); *H04L 1/0681* (2013.01); *H04L 5/001* (2013.01); *H04L 5/0053* (2013.01); *H04W 72/1289* (2013.01)

(58) Field of Classification Search
CPC ............ H04W 72/042; H04W 72/1289; H04L 1/0681; H04L 5/001; H04L 5/0053
(Continued)

(56) References Cited

U.S. PATENT DOCUMENTS

| 2017/0086220 A1 | 3/2017 | Kim et al. | |
| 2018/0227156 A1* | 8/2018 | Papasakellariou ... | H04B 7/0456 |
| 2019/0222358 A1* | 7/2019 | Xu ...................... | H04W 72/042 |

OTHER PUBLICATIONS

European Patent Office Application Serial No. 18817229.0, Search Report dated Feb. 15, 2021, 10 pages.
(Continued)

*Primary Examiner* — Peter G Solinsky
(74) *Attorney, Agent, or Firm* — Lee, Hong, Degerman, Kang & Waimey

(57) ABSTRACT

A method by which a terminal receives a downlink control channel in a wireless communication system is disclosed. Particularly, the method monitors candidate physical downlink control channels (PDCCHs) composed of control channel elements (CCEs), the number of which corresponds to an aggregation level, so as to receive a PDCCH, wherein CCEs for candidate PDCCHs of a higher aggregation level include all of the CCEs for candidate PDCCHs of a lower aggregation level, and the CCEs for candidate PDCCHs of the lower aggregation level included in each of the candidate PDCCHs of the higher aggregation level can be determined using a matrix on the basis of the magnitude of the higher aggregation level and the number of the candidate PDCCHs of the higher aggregation level.

15 Claims, 11 Drawing Sheets

(51) Int. Cl.
   *H04L 5/00*       (2006.01)
   *H04W 72/12*      (2009.01)
(58) Field of Classification Search
   USPC .......................................................... 370/329
   See application file for complete search history.

(56) References Cited

OTHER PUBLICATIONS

Ericsson, "Overview of DL Control Channel Design," 3GPP TSG-RAN WG1 Meeting #89, R1-1709062, May 2017, 10 pages.
LG Electronics, "Discussion on hierarchical search space design," 3GPP TSG RAN WG1 Meeting #88, R1-1702478, Feb. 2017, 6 pages.
PCT International Application No. PCT/KR2018/006589, Written Opinion of the International Searching Authority dated Sep. 7, 2018, 17 pages.
Huawei, et al., "Search space design", 3GPP TSG RAN WG1 Meeting #89, R1-1706944, May 2017, 4 pages.
Salihu, B. et al., "New Remapping Strategy for PDCCH Scheduling for LTE-Advanced Systems", Journal of Communications vol. 9 No. 7, Jul. 2014, 9 pages.
QUALCOMM, "PDCCH nested search space design", 3GPP TSG RAN WG1 Meeting #89, R1-1708609, May 2017, 5 pages.
Samsung, "On Hierarchical Search Space Structure", 3GPP TSG RAN WG1 Meeting #89, R1-1707990, May 2017, 4 pages.

\* cited by examiner

FIG. 1
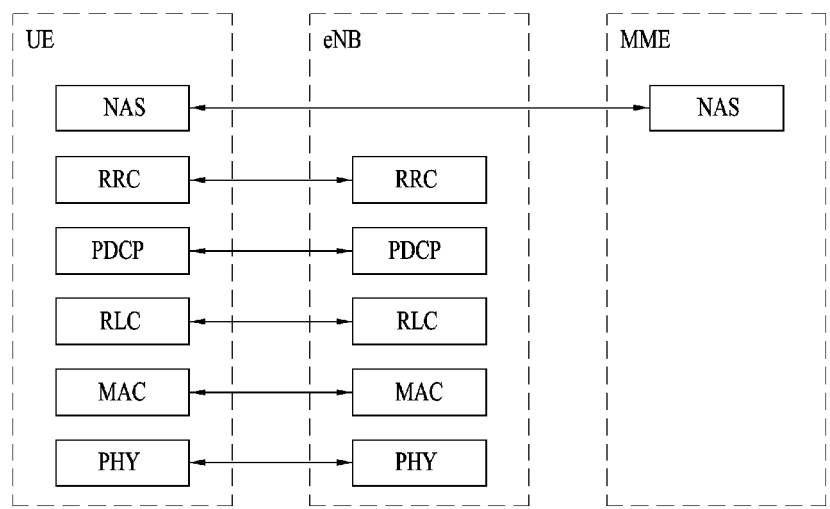
(A) CONTROL-PLANE PROTOCOL STACK
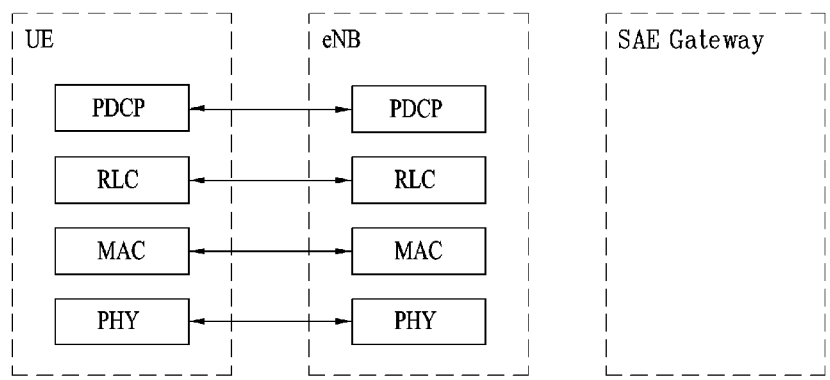
(B) USER-PLANE PROTOCOL STACK FIG. 5
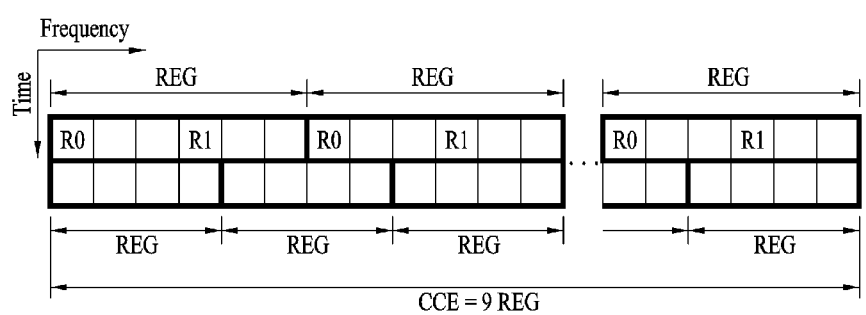
(a) 1 TX or 2 TX
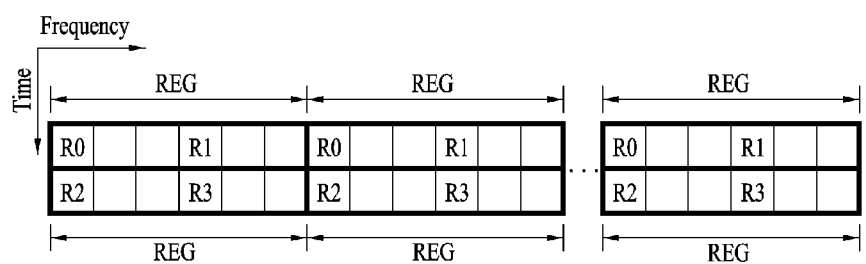
(b) 4 TX FIG. 8
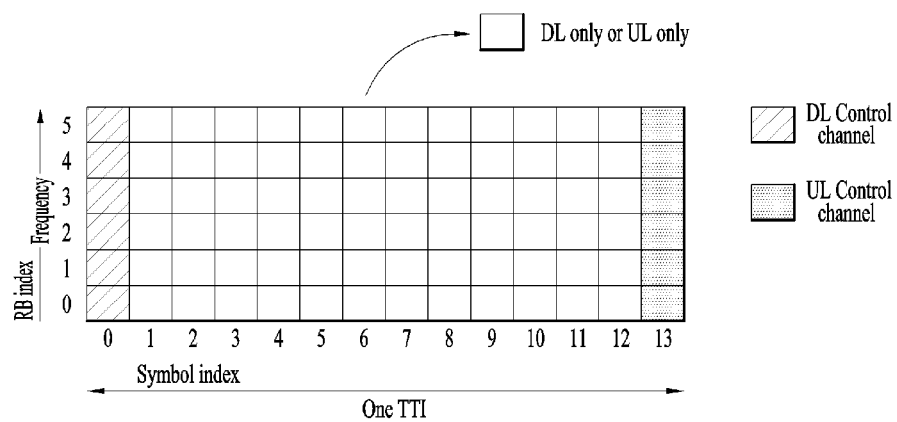
(a)
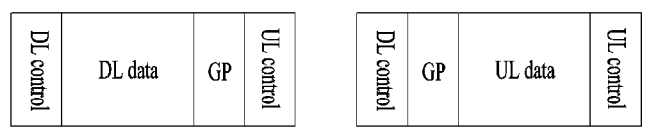
(b)

| 0 | 1 | 2 | 3 |
|---|---|---|---|
| 4 | 5 | 6 | 7 |

METHOD FOR RECEIVING DOWNLINK CONTROL CHANNEL AND DEVICE THEREFOR

CROSS-REFERENCE TO RELATED APPLICATIONS

This application is the National Stage filing under 35 U.S.C. 371 of International Application No. PCT/KR2018/006589, filed on Jun. 11, 2018, which claims the benefit of U.S. Provisional Application No. 62/519,102, filed on Jun. 13, 2017, the contents of which are all hereby incorporated by reference herein in their entirety.

TECHNICAL FIELD

The present disclosure relates to a method of receiving a downlink control channel and apparatus therefor, and more particularly, to a method of receiving a downlink control channel based on a search space by configuring the search space for receiving the downlink control channel and apparatus therefor.

BACKGROUND ART

As more and more communication devices demand greater communication traffic as times go by, the next generation 5 G system, which is wireless broadband communication, is being required over the existing LTE systems. In the next generation 5 G system named NewRAT, communication scenarios are classified into Enhanced Mobile BroadBand (eMBB), Ultra-reliability and low-latency communication (URLLC), Massive Machine-Type Communications (mMTC), etc.

Here, eMBB is the next generation mobile communication scenario having such properties as High Spectrum Efficiency, High User Experienced Data Rate, High Peak Data Rate and the like, URLLC is the next generation mobile communication scenario having such properties as Ultra Reliable, Ultra Low Latency, Ultra High Availability and the like (e.g., V2X, Emergency Service, Remote Control), and mMTC is the next generation mobile communication scenario having such properties as Low Cost, Low Energy, Short Packet, Massive Connectivity and the like (e.g., IoT).

DISCLOSURE

Technical Task

One technical task of the present disclosure is to provide a method of receiving a downlink control channel and apparatus therefor.

Technical tasks obtainable from the present disclosure are non-limited by the above-mentioned technical task. And, other unmentioned technical tasks can be clearly understood from the following description by those having ordinary skill in the technical field to which the present disclosure pertains.

Technical Solutions

According to one embodiment, a method of receiving a downlink control channel by a user equipment in a wireless communication system may include receiving PDCCH by monitoring candidate Physical Downlink Control Channels (PDCCHs) configured with Control Channel Elements (CCEs) of which number is related to an aggregation level, CCEs for candidate PDCCHs of a higher aggregation level may include all CCEs for candidate PDCCHs of a lower aggregation level, and the CCEs for the candidate PDCCHs of the lower aggregation level included in each of the candidate PDCCHs of the higher aggregation level may be determined based on a matrix based on a size of the higher aggregation level and the number of the candidate PDCCHs of the higher aggregation level.

In this case, a size of a row of the matrix may be related to the size of the higher aggregation level and a size of a column of the matrix may be related to the number of the candidate PDCCHs of the higher aggregation level.

The CCEs may be arranged on each element configuring the matrix with reference to indexes of the CCEs and the CCEs arranged in the same column may be included in candidate PDCCH of a same higher aggregation level.

The method may further include indexing CCEs included in a resource set for the PDCCH transmission in a manner of indexing CCEs except CCEs for the candidate PDCCH of the lower aggregation level and determining a remaining CCE except the CCEs for the candidate PDCCHs of the lower aggregation level among the CCEs for the candidate PDCCHs of the higher aggregation level based on indexes of the indexed CCEs.

An index of the determined remaining CCE may be re-indexed with reference to indexes of the CCEs for the candidate PDCCHS of the lower aggregation level.

Based on a case that an index of a start CCE for the candidate PDCCHs of the higher aggregation level is not related to a CCE bundling size for CCE interleaving, CCEs related to indexes resulting from shifting indexes of the determined CCEs for the candidate PDCCHs of the higher aggregation level by a difference of the index of the start CCE in the CCE bundling size may be re-determined as CCEs for the candidate PDCCH of the higher aggregation level.

And, an interval between the candidate PDCCHs of the higher aggregation level may be determined based on a value resulting from dividing the number of the CCEs included in the resource set for the PDCCH transmission by the number of the candidate PDCCHs of the higher aggregation level.

According to another embodiment, a user equipment in receiving a downlink control channel in a wireless communication system may include a transceiver transceiving a signal with a base station and a processor controlling the transceiver to receive PDCCH by monitoring candidate Physical Downlink Control Channels (PDCCHs) configured with Control Channel Elements (CCEs) of which number is related to an aggregation level, CCEs for candidate PDCCHs of a higher aggregation level may include all CCEs for candidate PDCCHs of a lower aggregation level, and the CCEs for the candidate PDCCHs of the lower aggregation level included in each of the candidate PDCCHs of the higher aggregation level may be determined based on a matrix based on a size of the higher aggregation level and the number of the candidate PDCCHs of the higher aggregation level.

In this case, a size of a row of the matrix may be related to the size of the higher aggregation level and a size of a column of the matrix may be related to the number of the candidate PDCCHs of the higher aggregation level.

The CCEs may be arranged on each element configuring the matrix with reference to indexes of the CCEs and the CCEs arranged in the same column may be included in candidate PDCCH of a same higher aggregation level.

The user equipment may further include indexing CCEs included in a resource set for the PDCCH transmission in a manner of indexing CCEs except CCEs for the candidate PDCCH of the lower aggregation level and determining a remaining CCE except the CCEs for the candidate PDCCHs of the lower aggregation level among the CCEs for the candidate PDCCHs of the higher aggregation level based on indexes of the indexed CCEs.

An n index of the determined remaining CCE may be re-indexed with reference to indexes of the CCEs for the candidate PDCCHS of the lower aggregation level.

Based on a case that an index of a start CCE for the candidate PDCCHs of the higher aggregation level is not related to a CCE bundling size for CCE interleaving, CCEs related to indexes resulting from shifting indexes of the determined CCEs for the candidate PDCCHs of the higher aggregation level by a difference of the index of the start CCE in the CCE bundling size may be re-determined as CCEs for the candidate PDCCH of the higher aggregation level.

And, an interval between the candidate PDCCHs of the higher aggregation level may be determined based on a value resulting from dividing the number of the CCEs included in the resource set for the PDCCH transmission by the number of the candidate PDCCHs of the higher aggregation level.

Advantageous Effects

According to the present disclosure, as a channel estimation result of a candidate downlink control channel of a lower aggregation level is usable for channel estimation of a candidate downlink control channel of a higher aggregation level, efficiency of downlink control channel decoding can be increased.

Effects obtainable from the present disclosure are non-limited by the above-mentioned effect. And, other unmentioned effects can be clearly understood from the following description by those having ordinary skill in the technical field to which the present disclosure pertains.

DESCRIPTION OF DRAWINGS

FIG. 1 is a diagram illustrating structures of a control plane and a user plane of a radio interface protocol between a UE and an E-UTRAN based on the 3GPP radio access network specification.

FIG. 5 is a diagram showing a resource unit used in configuring a downlink control channel in an LTE system.

FIG. 8 is an example of a self-contained subframe structure.

BEST MODE FOR DISCLOSURE

Figure 2:
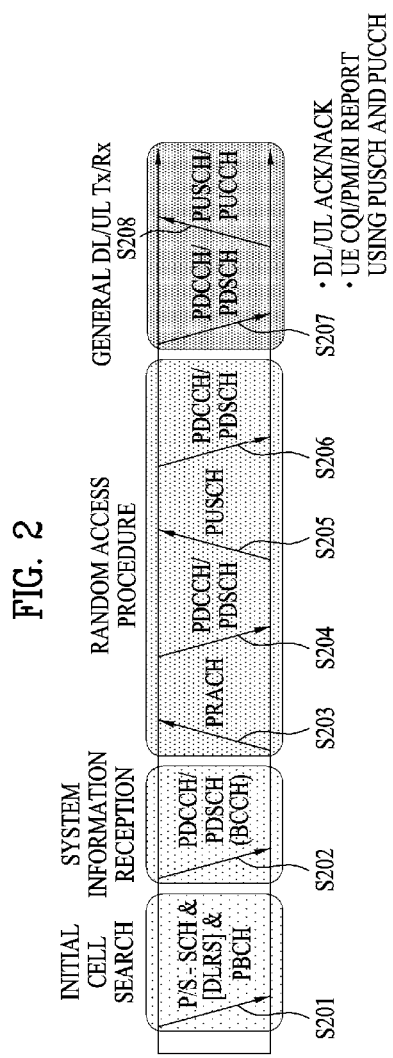
FIG. 2 is a diagram illustrating physical channels used in a 3GPP system and a general signal transmission method using the same.

Hereinafter, the structures, operations, and other features of the present invention will be understood readily from the embodiments of the present invention, examples of which are described with reference to the accompanying drawings. The embodiments which will be described below are examples in which the technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems corresponding to the aforementioned definition.

In the present disclosure, a base station (eNB) may be used as a broad meaning including a remote radio head (RRH), an eNB, a transmission point (TP), a reception point (RP), a relay, etc.

FIG. 1 is a view illustrating structures of a control plane and a user plane of a radio interface protocol between a UE and an E-UTRAN based on the 3GPP radio access network specification. The control plane refers to a path through which control messages used by a User Equipment (UE) and a network to manage a call are transmitted. The user plane refers to a path through which data generated in an application layer, e.g. voice data or Internet packet data, is transmitted.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of radio bearers. The radio bearers refer to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

Downlink transport channels for data transmission from a network to a UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

FIG. 2 is a view illustrating physical channels used in a 3GPP system and a general signal transmission method using the same.

A UE performs initial cell search such as establishment of synchronization with an eNB when power is turned on or the UE enters a new cell (step S201). The UE may receive a Primary Synchronization Channel (P-SCH) and a Secondary Synchronization Channel (S—SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of initial cell search, the UE may receive a Physical Downlink Control Channel (PDCCH) and a Physical Downlink Shared Channel (PDSCH) according to information carried on the PDCCH to acquire more detailed system information (step S202).

Meanwhile, if the UE initially accesses the eNB or if radio resources for signal transmission are not present, the UE may perform a random access procedure (steps S203 to S206) with respect to the eNB. To this end, the UE may transmit a specific sequence through a Physical Random Access Channel (PRACH) as a preamble (steps S203 and S205), and receive a response message to the preamble through the PDCCH and the PDSCH corresponding thereto (steps S204 and S206). In the case of a contention-based RACH, a contention resolution procedure may be additionally performed.

The UE which performs the above procedures may receive a PDCCH/PDSCH (step S207) and transmit a Physical Uplink Shared Channel (PUSCH)/Physical Uplink Control Channel (PUCCH) (step S208) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information, transmitted by the UE to the eNB through uplink or received by the UE from the eNB through downlink, includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit control information such as CQI/PMI/RI through the PUSCH and/or the PUCCH.

Figure 3:
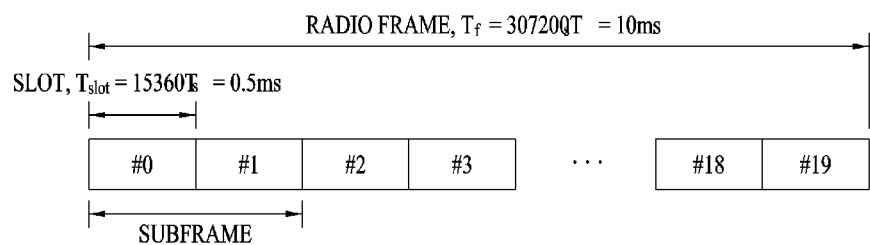
FIG. 3 is a diagram illustrating the structure of a radio frame used in an LTE system.

FIG. 3 is a view illustrating the structure of a radio frame used in an LTE system.

Referring to FIG. 3, the radio frame has a length of 10 ms (327200 Ts) and includes 10 equally-sized subframes. Each of the subframes has a length of 1 ms and includes two slots. Each of the slots has a length of 0.5 ms (15360 Ts). In this case, Ts denotes sampling time and is represented by $Ts=1/(15 kHz \times 2048)=3.2552 \times 10-8$ (about 33 ns). Each slot includes a plurality of OFDM symbols in a time domain and includes a plurality of Resource Blocks (RBs) in a frequency domain. In the LTE system, one resource block includes 12 subcarriers×7 (or 6) OFDM symbols. A Transmission Time Interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 4:
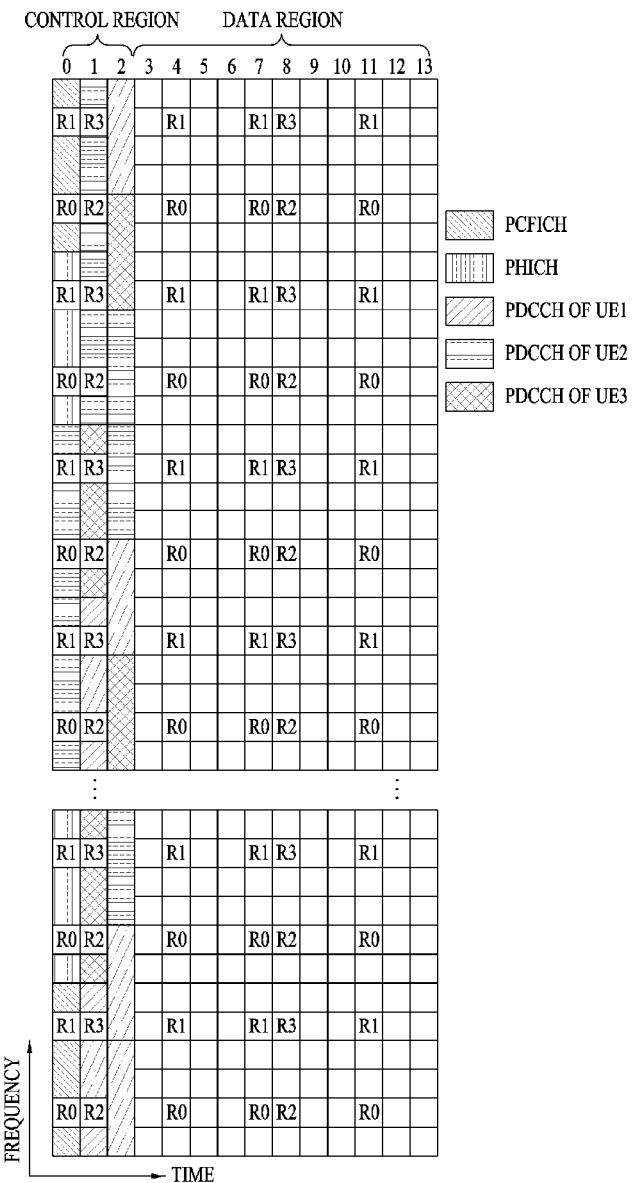
FIG. 4 is a diagram illustrating the structure of a DL radio frame used in an LTE system.

FIG. 4 is a view illustrating control channels contained in a control region of one subframe in a downlink radio frame.

Referring to FIG. 4, one subframe includes 14 OFDM symbols. The first to third ones of the 14 OFDM symbols may be used as a control region and the remaining 13 to 11 OFDM symbols may be used as a data region, according to subframe configuration. In FIG. 4, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier×one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH, physical downlink control channel, is allocated to the first n OFDM symbols of a subframe. In this case, n is an integer greater than 1 and is indicated by the PCFICH. The PDCCH is comprised of one or more Control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) "A" and information about data, that is transmitted using radio resources "B" (e.g., frequency location) and transport format information "C" (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

FIG. 5 is a diagram showing a resource unit used in configuring a downlink control channel in an LTE system. Particularly, FIG. 6 (a) shows a case that the number of Tx antenna(s) of a base station is 1 or 2 and FIG. 6 (b) shows a case that the number of Tx antennas of a base station is 4. A Reference Signal (RS) pattern is different depending on the number of Tx antenna(s) only but a configuring method of a resource unit related to a control channel is identical.

Referring to FIG. 5, a basic resource unit of a DownLink (DL) control channel is Resource Element Group (REG). The REG is configured with 4 neighboring Resource Elements (REs) in an RS excluded state. The REG is denoted by a bold line. PCFICH and PHICH include 4 REGs and 3 REGs, respectively. PDCCH is configured in unit of Control Channel Elements (CCEs) and one CCE includes 9 REGs.

In order for a UE to check whether PDCCH configured with L CCEs is transmitted to itself, the UE is configured to check $M^{(L)}$ (≥L) contiguous CCEs or CCEs arranged by a specific rule. A value of L the UE should consider may become plural. CCE sets the UE should check for PDCCH reception are called a search space. For example, an LTE system defines a search space like Table 1.

TABLE 1

| Type | Search space $S_k^{(L)}$ Aggregation level L | Size [in CCEs] | Number of PDCCH candidates $M^{(L)}$ |
|---|---|---|---|
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

Here, a CCE aggregation level L indicates the number of CCEs configuring PDCCH, $S_k^{(L)}$ indicates a search space of the CCE aggregation level L, and $M^{(L)}$ is the number of PDCCH candidates that should be monitored in the search space of the aggregation level L.

A search space may be categorized into a UE-specific search space allowing an access for a specific UE only and a common search space allowing an access for all UEs within a cell. A UE monitors a common search space of which CCE aggregation level is 4 or 8 and a UE-specific search space of which CCE aggregation level is 1, 2, 4 or 8. The common search space and the UE-specific search space may overlap each other.

Moreover, a position of a first CCE (having a smallest index) in a PDCCH search space given to a random UE for each CCE aggregation level value changes in each subframe depending on a UE. This is named PDCCH search space hashing.

The CCE may be distributed on a system band. Specifically, a plurality of logically contiguous CCEs may be inputted to an interleaver, and the interleaver performs a function of mixing a plurality of the inputted CCEs in REG unit. Hence, a frequency/time resource configuring a single CCE is distributed in a manner of being physically scattered in the whole frequency/time domain within a control region of a subframe. Eventually, although a control channel is configured in CCE unit, interleaving is performed in REG unit. Hence, frequency diversity and interference randomization gain can be maximized.

Figure 6:
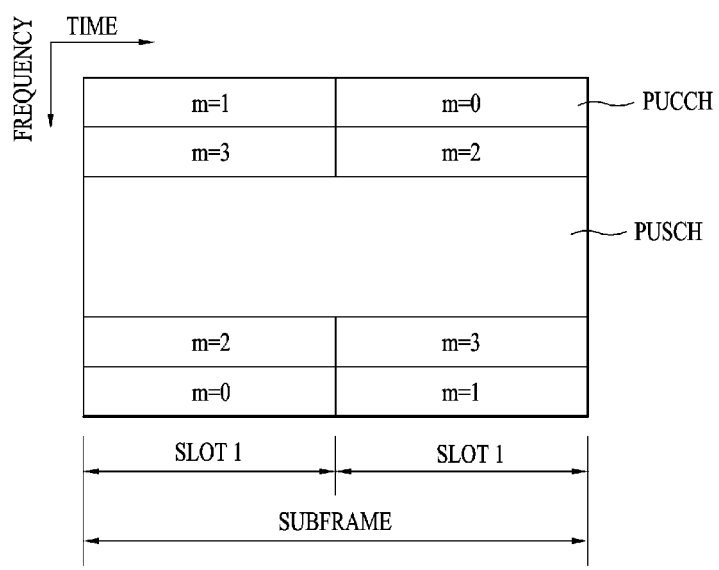
FIG. 6 is a diagram illustrating the structure of a UL subframe in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one RB in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

Hereinbelow, a description of channel state information (CSI) reporting will be given. In the current LTE standard, a MIMO transmission scheme is categorized into open-loop MIMO operated without CSI and closed-loop MIMO operated based on CSI. Especially, according to the closed-loop MIMO system, each of the eNB and the UE may perform beamforming based on CSI in order to obtain multiplexing gain of MIMO antennas. To acquire CSI from the UE, the eNB allocates a PUCCH or a PUSCH to the UE and commands the UE to feed back CSI regarding a DL signal.

CSI is divided into three types of information: an RI, a PMI, and a CQI. First, RI is information on a channel rank as described above and indicates the number of streams that may be received by the UE via the same time-frequency resource. Since RI is determined by long-term fading of a channel, RI may be generally fed back at a cycle longer than that of PMI or CQI.

Second, PMI is a value reflecting a spatial characteristic of a channel and indicates a precoding matrix index of the eNB preferred by the UE based on a metric of signal-to-interference plus noise ratio (SINR). Lastly, CQI is information indicating the strength of a channel and indicates a reception SINR obtainable when the eNB uses PMI.

In a 3GPP LTE-A system, the eNB may configure a plurality of CSI processes for the UE and receive report for CSI regarding each CSI process. Herein the CSI process includes a CSI-RS resource for measuring quality of a signal received from the eNB and a CSI-interference measurement (CSI-IM) resource for measuring interference, i.e., an interference measurement resource (IMR).

In a millimeter wave (mmW) band, wavelength is shortened, and thus a plurality of antenna elements may be installed in the same area. Specifically, a total of 64 (=8×8) antenna elements may be installed in a 4-by-4 cm panel in a 30 GHz band with a wavelength of about 1 cm in a 2-dimensional array at intervals of 0.5λ (wavelength). Therefore, in mmW, increasing coverage or throughput by increasing beamforming (BF) gain using multiple antenna elements has recently been taken into consideration.

If a transceiver unit (TXRU) is provided for each antenna element to enable adjustment of transmit power and phase, independent BF is possible for each frequency resource. However, installing TXRU in all of the about 100 antenna elements is less feasible in terms of cost. Therefore, a method of mapping multiple antenna elements to one TXRU and adjusting the direction of a beam using an analog phase shifter is under consideration. This analog BF method may make only one beam direction in the whole band, and thus may not perform frequency selective BF, which is disadvantageous.

Hybrid BF using B TXRUs less in number than Q antenna elements may be considered as an intermediate type of digital BF and analog BF. In this case, the number of beam directions in which beams may be transmitted at the same time is limited to B or less, which depends on a connection method of B TXRUs and Q antenna elements.

Figure 7:
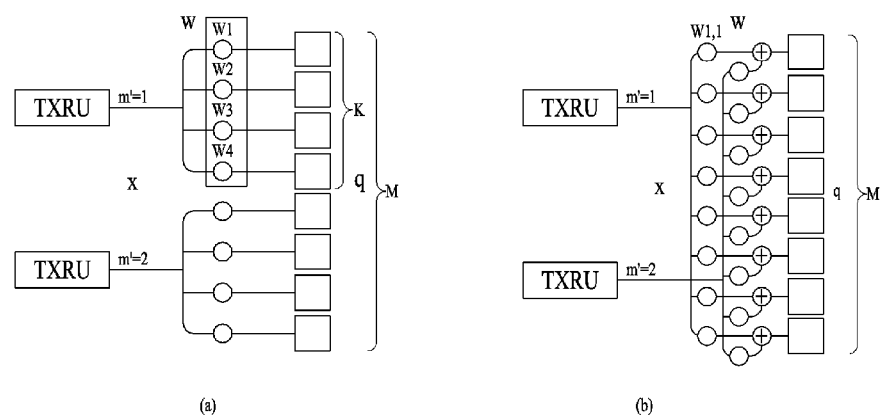
FIG. 7 illustrates examples of a connection mode of TXRU and an antenna element.

FIG. 7 illustrates exemplary connection schemes between TXRUs and antenna elements.

(a) of FIG. 7 illustrates connection between a TXRU and a sub-array. In this case, an antenna element is connected only to one TXRU. In contrast, (b) of FIG. 7 illustrates connection between a TXRU and all antenna elements. In this case, an antenna element is connected to all TXRUs. In FIG. 7, W represents a phase vector subjected to multiplication in an analog phase shifter. That is, a direction of analog BF is determined by W. Herein, CSI-RS antenna ports may be mapped to TXRUs in a one-to-one or one-to-many correspondence.

As more communication devices have demanded higher communication capacity, there has been necessity of enhanced radio broadband communication relative to legacy radio access technology (RAT). In addition, massive machine type communication (MTC) for providing various services anytime and anywhere by connecting a plurality of devices and objects to each other is also one main issue to be considered in next-generation communication. Further, a communication system to be designed in consideration of services/UEs sensitive to reliability and latency is under discussion. Thus, introduction of next-generation RAT has been discussed by taking into consideration such matters. In the present invention, the above technology is referred to as NewRAT for convenience of description.

To minimize data transmission latency in a time division duplex (TDD) system, the structure of a self-contained subframe as illustrated in FIG. 8(a), (b) is considered in fifth-generation (5G) NewRAT. FIG. 8(a), (b) illustrate the structure of an exemplary self-contained subframe.

In FIG. 8(a), the hatched area represents a DL control region and the black area represents a UL control region. The area having no marks may be used for either DL data transmission or UL data transmission. In this structure, DL transmission and UL transmission may be sequentially performed in one subframe to send DL data and receive UL ACK/NACK therefor in a subframe. As a result, this structure may reduce time taken to retransmit data when a data transmission error occurs, thereby minimizing the latency of final data transmission.

In such a self-contained subframe structure, a time gap is required in order for the eNB and the UE to switch from a transmission mode to a reception mode or from the reception mode to the transmission mode. To this end, some OFDM symbols at the time of switching from DL to UL in the subframe structure may be set as a guard period (GP).

Examples of the self-contained subframe type that may be configured/set in the system operating based on NewRAT may consider at least four subframe types as follows.

(1) DL control period+DL data period+GP+UL control period (2) DL control period+DL data period (3) DL control period+GP+UL data period+UL control period (4) DL control period+GP+UL data period FIG. 8 (b) shows subframe types of (1) and (3) among the above-described 4 kinds of subframe types.

In such a structure, one or more symbols may be allocated for a DL control channel and control information may be transmitted by utilizing the DL control channel. In this case, Resource Element Group (REG), which is a minimum unit for transmitting control information, may be configured. And, Control Channel Element (CCE) may be configured by grouping such REGs with reference to a predetermined number. For example, REG may be configured in unit of 1 Resource Block (RB) and CCE may be configured in unit of 6 REGs.

Meanwhile, according to an Aggregation Level (AL), using one or more CCEs, a DL control channel may be transmitted to a UE. Specifically, by utilizing a hashing function, according to a size of a DL control channel of a size or a resource block set resource, a candidate CCE for transmitting control information is configured, thereby configuring a search space for each UE.

In this case, the size of the resource block set resource may be a size of a Control Resource Set (CORSET) for transmitting a DL control channel.

Now, a search space configuring method considerable by NewRAT (NR) shall be described in earnest as follows.

When a search space is configured per UE, the different number of candidate Physical Downlink Control Channels (PDCCHs) may be provided according to an aggregation level of CCE. And, decoding on a candidate PDCCH per aggregation level, which is computed using a hashing function, is performed.

In doing so, if a CCE belonging to a candidate PDCCH of a lower aggregation level and a CCE belonging to a candidate PDCCH of a higher aggregation level are configured to overlap each other, a result of channel estimation, which was performed when the candidate PDCCH of the lower aggregation level was decoded, can be reused in decoding the candidate PDCCH of the higher aggregation level. Therefore, CCE channel estimation on the lower aggregation level is used for the higher aggregation level as it is without repeating the channel estimation on CCE, according to an aggregation level, efficiency can be raised. Similarly, in case of performing decoding on a higher aggregation level according to an implementation scheme of a UE first, efficiency of channel estimation may be raised by reusing the CCE channel estimation on the higher aggregation level for a lower aggregation level.

To this end, a hashing function may be determined in a manner that CCE corresponding to a candidate PDCCH of the lower aggregation level can be configured with some of CCEs corresponding to a candidate PDCCH of the highest aggregation level. Otherwise, CCE corresponding to a candidate PDCCH of the lowest Aggregation Level (AL) may be utilized for candidate PDCCH configuration of a higher aggregation level as it is.

Figures 9, 10:
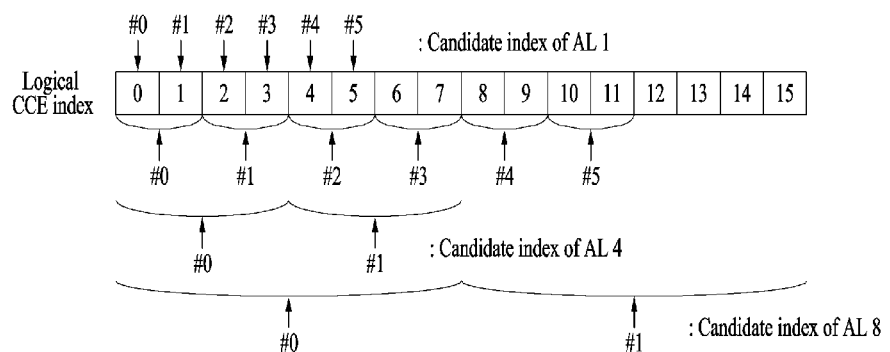
FIGS. 9 to 11 show embodiments of configuring a search space of a nested structure.

For example, when aggregation levels are configured with 1, 2, 4 and 8 and the numbers of candidate PDCCHs are set to 6, 6, 2 and 2 therefor, respectively, a search space may be configured as shown in FIG. 9.

Meanwhile, although FIG. 9 assumes a case that a start point of a search space of a UE is a CCE index 0, the start point of the search space may be randomized by a UE ID or the like. Equation 1 in the following shows one example of a hashing function configuring a randomized search space per UE. In Equation 1, it may represent $Y_k=(A \cdot Y_{k-1}) \mod D$ and it may also mean $Y_{-1}=n_{RNTI} \neq 0$, $A=39827$, $D=65537$, $k=\lfloor n_s/2 \rfloor$, $n_s$=slot number. L indicates a size of an aggregation level, and m indicates a candidate PDCCH index of a corresponding aggregation level. For example, when the candidate PDCCH number of the corresponding aggregation level is 6, it may show that m=0, 1, 2, 3, 4, 5.

Moreover, indicates the number of CCEs corresponding to a Resource Block (RB) set or PDCCH resource size and i indicates a CCE index configuring a candidate PDCCH at a corresponding aggregation level. For example, when an aggregation level is 4, it may mean i=0, 1, 2, 3. Here, Equation 1 is just one example for representing the aforementioned search space, by which the present disclosure is non-limited. In case of considering Carrier Aggregation (CA), m in the considered Equation 1 may be substituted with $m+M^{(L)} \cdot n_{CI}$. Here, $n_{CI}$ may become a carrier indicator field value. Yet, for clarity of description, in the present disclosure, it is assumed that $Y_k=0$.

$$\{(Y_k + L \cdot m) \mod \lfloor n_{CCB} \rfloor\} + i \qquad \text{[Equation 1]}$$

In the embodiment described on the basis of Equation 1, CCEs of a candidate PDCCH of a lower aggregation level are sequentially bundled so as to be made to correspond to a candidate PDCCH of a higher aggregation level. For example, CCEs #0and #1among CCEs #0, #1, #2, #3, #4, and #5, which are a candidate PDCCH of an aggregation level 1, are bundled to be made to correspond to a candidate PDCCH #0of an aggregation level 2, CCEs #2and #3are bundled to be made to correspond to a candidate PDCCH #1of the aggregation level 2, and CCEs #4and #5are bundled to be made to correspond to a candidate PDCCH #2of the aggregation level 2. Meanwhile, in this case, 3candidate PDCCHs are configured. If the number of candidate PDCCHs of the aggregation level 2is 6, CCEs #6, #7, #8, #9, #10and #11are sequentially bundled in addition to be made to correspond to candidate PDCCHs #3, #4and #5of the aggregation level 2, respectively.

Meanwhile, based on Equation 1, in case of configuring a search space, a processing time for a UE to detect each candidate PDCCH may be differentiated. Namely, in the above example, it is assumed that a UE decodes candidate PDCCHs #0, #1, #2, #3, #4and #5and then decodes candidate PDCCHs with reference to an aggregation level 2. If so, since the candidate PDCCH #0of the aggregation level 2can use the detection result values of the candidate PDCCHs #0and #1of the aggregation level 1as they are, a processing time becomes shortened relatively. Yet, since the candidate PDCCH #4of the aggregation level 2should attempt detection in a state of having no information, a processing time for the candidate PDCCH #4 becomes longer than that of the candidate PDCCH #0.

Therefore, in order to minimize a difference of a processing time per candidate PDCCH, a method of dispersing a multitude of CCEs corresponding to each candidate PDCCH of a lower Aggregation Level (AL) on each candidate PDCCH of a higher Aggregation Level (AL) may be considered.

Equation 2 in the following is to indicate a per-aggregation level CCE configuring a search space. In the present equation, m' is 0, 1, . . . , $(L \cdot M^{(L)}-1)$, where $M^{(L)}$ means the number of candidate PDCCHs corresponding to a size L of an aggregation level.

$$\{(Y_k \cdot m') \mod \lfloor N_{CCB} \rfloor\} \qquad \text{[Equation 2]}$$

By Equation 2, a CCE configuring a candidate PDCCH per aggregation level may be determined. In this case, the per-aggregation level candidate PDCCHs may satisfy the nested structure that a CCE configuring a candidate PDCCH of a lower aggregation level is included in a CCE configuring a candidate PDCCH of a higher aggregation level.

For example, in one embodiment based on Equation 2, CCEs #0, #1, #2, #3, #4and #5corresponding to 6candidate PDCCHs of an aggregation level 2are made to correspond to 6candidate PDCCHs of an aggregation level 2one by one, and CCEs #6, #7, #8, #9, #10and #11are additionally made to correspond to 6candidate PDCCHs of the aggregation level 2 one by one. So to speak, CCEs #0and #6are made to correspond to a candidate PDCCH #0of the aggregation level 2, CCEs #1and #7are made to correspond to a candidate PDCCH #1of the aggregation level 2, CCEs #2and #8are made to correspond to a candidate PDCCH #2of the aggregation level 2, CCEs #4and #10are made to correspond to a candidate PDCCH #4of the aggregation level 2, and CCEs #5and #11are made to correspond to a candidate PDCCH #5of the aggregation level 2.

Yet, in case that the candidate PDCCH number of the lower AL is different from that of the higher AL, it may be difficult to apply the method based on Equation 2 as it is. So, a more general method will be explained in order that CCEs included in a candidate PDCCH of a lower AL are made to correspond to CCE included in a candidate PDCCH of a higher AL.

By configuring a matrix for a multitude of CCEs corresponding to the candidate PDCCH number of a higher AL, which can include all the CCEs corresponding to a candidate PDCCH of a lower AL, CCEs included in the candidate PDCCH of the lower AL may be made to correspond to CCE included in the candidate PDCCH of the higher AL. Specifically, by configuring a matrix in a manner that the number of columns corresponds to the candidate PDCCH number of the higher AL and that the number of rows corresponds to a size of the higher AL, CCEs belonging to the same column may be made to configure a candidate PDCCH for a specific AL.

A specific example is described through FIG. 10 as follows. First of all, when the candidate PDCCH number of an aggregation level 1is 6, CCEs #0, #1, #2, #3, #4, and #5may be made to correspond to each candidate PDCCH. If the candidate PDCCH number of an aggregation level 2 is 4, the matrix shown in FIG. 10 is configured, CCEs belonging to the same column are grouped, and the grouped CCEs may be then made to correspond to each candidate PDCCH of the aggregation level 2. Namely, referring to FIG. 10, a candidate PDCCH #0of the aggregation level 2may be configured with CCEs #0and #4, a candidate PDCCH

1may be configured with CCEs #1and #5, a candidate PDCCH #2may be configured with CCEs #2and #6, a candidate PDCCH #3may be configured with CCEs #3and #7.

The above-described embodiment is applicable to a case that the candidate PDCCH number of a lower AL is equal to that of a higher AL. Moreover, CCE indexes may be enumerated in a matrix by a row-first scheme or a column-first scheme. In this case, when the number of rows is set to the number of a size of the higher AL and the number of columns is set to the candidate PDCCH number of the higher AL, as shown in FIG. 10, if CCE indexes are enumerated by the row-first scheme and a candidate PDCCH of the higher AL is then configured in a column direction, CCEs configuring a single candidate PDCCH may be configured so as to be dispersed. If CCE indexes are enumerated by the column-first scheme and a candidate PDCCH of the higher AL is configured in a column direction, like the embodiment based on Equation 1, adjacent CCEs may configure a single candidate PDCCH of the higher AL.

According to another embodiment for configuring a candidate PDCCH, CCE configuring a per-AL candidate PDCCH may be determined with reference to a lowest AL. And, by re-indexing a search space except CCEs configuring a candidate PDCCH of a lower AL, the rest of CCEs configuring a candidate PDCCH of a higher AL may be determined. Such an embodiment shall be described based on a hashing function shown in Equation 3.

$$\{(Y_k+m'')\bmod \lfloor N_{CCB} \rfloor\} \qquad \text{[Equation 3]}$$

In the present equation, m" is represented as follows. Here, $M^{(L_{higher})}$, $M^{(L_{lower})}$ indicate the number of candidate PDCCHs corresponding to a higher AL and the number of candidate PDCCHs corresponding to a lower AL, respectively. $L_{higher}$, $L_{lower}$ and indicate sizes of the higher AL and the lower AL, respectively.

$$m'' = 0, 1, \ldots, \left(L_{higher} \cdot M^{(L_{higher})} - L_{lower} \cdot M^{(L_{lower})} - 1\right),$$

$$\text{if } L_{higher} \cdot M^{(L_{higher})} - L_{lower} \cdot M^{(L_{Lower})}$$

$$= 0, 1, \ldots, \left(L_{higher} \cdot M^{(L_{higher})} - 1\right),$$

$$\text{if } L_{higher} \cdot M^{(L_{higher})} - L_{lower} \cdot M^{(L_{Lower})} \le 0$$

$$= 0, 1, \ldots, (L_{lower} \cdot M^{(L_{lower})} - 1),$$

$$\text{if } L_{lower} = L_{lower}, M^{(L_{lowest})} = M^{(L_{lower})}$$

Here, an index value, which can become a value of m", means an index of the remaining CCEs for the re-indexed candidate PDCCH of the higher AL except CCEs configuring a candidate PDCCH of the lower AL.

For example, assuming that the number of candidate PDCCHs for an aggregation level 1and the number of candidate PDCCHs for an aggregation level 2are 6and 4, respectively, it is able to find CCEs #0, #1, #2, #3, #4and #5configuring the candidate PDCCH corresponding to the aggregation level 1l among a multitude of CCEs configuring a Resource Block (RB) set or control channel using Equation 3. In this case, the total number of CCEs configuring the candidate PDCCH corresponding to the aggregation level 2is 8and 2CCEs are further needed in addition to CCEs configuring the aggregation level 1.

Figure 11:
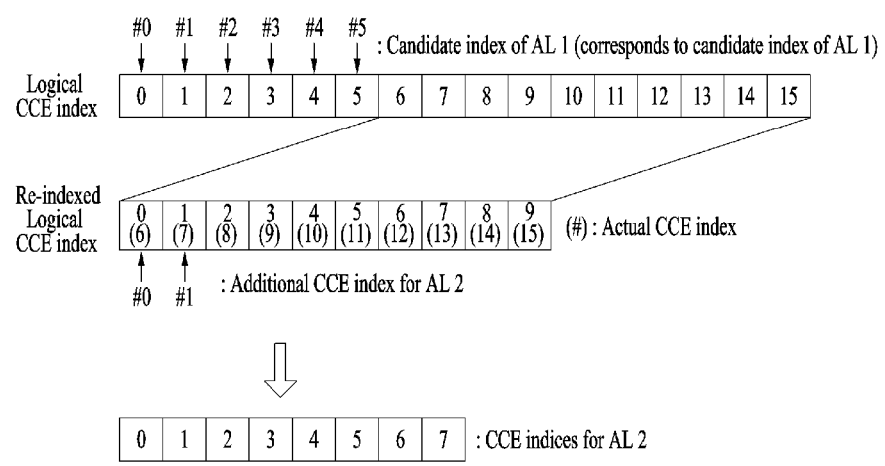

To this end, as shown in FIG. 11, after excluding CCEs corresponding to the aggregation level 1 from a multitude of CCEs configuring an RB set or control channel, the remaining CCEs are indexed again from #0and Equation 3is applied thereto, whereby additional CCEs #0and #1can be selected. In this case, the additionally selected CCEs #0and #1are re-indexed indexes. And, CCEs #6and #7, which are the original indexes of the re-indexed CCE #0and #1, may be used in configuring a candidate PDCCH of the aggregation level 2 together with CCEs #0, #1, #2, #3, #4and #5 selected from the aggregation level 1.

Thereafter, as described with reference to FIG. 10, by applying a method of configuring CCEs belonging to the same column as a single candidate PDCCH by configuring a matrix in a manner that the number of columns corresponds to the candidate PDCCH number of the higher AL and that the number of rows corresponds to a size of the higher AL, candidate PDCCHs of the higher AL may be configured. In this case, as described above, within the matrix, CCE indexes may be enumerated by the row-first scheme or the column-first scheme.

Meanwhile, when a search space is configured based on the aforementioned embodiments, a bundling structure of an interleaver may be considered. For example, when an inter-CCE bundling size in an interleaver is T, a start point of a search space found through a hashing function per UE may not correspond to a multiple of T including CCE #0. If the start point fails to correspond to the multiple of T, as start positions of a candidate PDCCH and a CCE bundling unit are different from each other, it may cause a problem of having difficulty in performing bundling efficiently. Therefore, indexes of all CCEs, which are found by a hashing function, may be shifted by a distance from 'a multiple of T including 0' closest to the start point of the search space of the corresponding UE.

For example, when an inter-CCE bundling size of an interleaver is 2, if a start point of a search space found through a hashing function by a UE is CCE #1, indexes of all CCEs found through the hashing function may be shifted by 1.

Moreover, according to the aforementioned embodiments, a scheme of continuously selecting CCEs corresponding to a corresponding aggregation level among a multitude of CCEs configuring an RB set or control channel from the beginning is taken as an example. Besides, a scheme of dispersing and selecting CCE corresponding to a corresponding aggregation level among a multitude of CCEs configuring an RB set or control channel may be applicable. For example, by configuring a hashing function like Equation 4, CCE corresponding to an aggregation level is dispersed and selected. And, a nested structure may be configured between a search space of a higher AL and a search space of a lower AL. So to speak, according to Equation 4in the following, each candidate PDCCH of each aggregation level is determined in a dispersed form but a candidate PDCCH of a lower AL may be included in candidate PDCCHs of a higher AL. Yet, in such a case, CCEs included in each candidate PDCCH may be contiguous.

$$\left\{\left(Y_k + \left\lfloor \frac{m \cdot N_{CCE}}{M^{(L)}} \right\rfloor\right) \bmod N_{CCE}\right\} + i \qquad \text{[Equation 4]}$$

Figure 12:
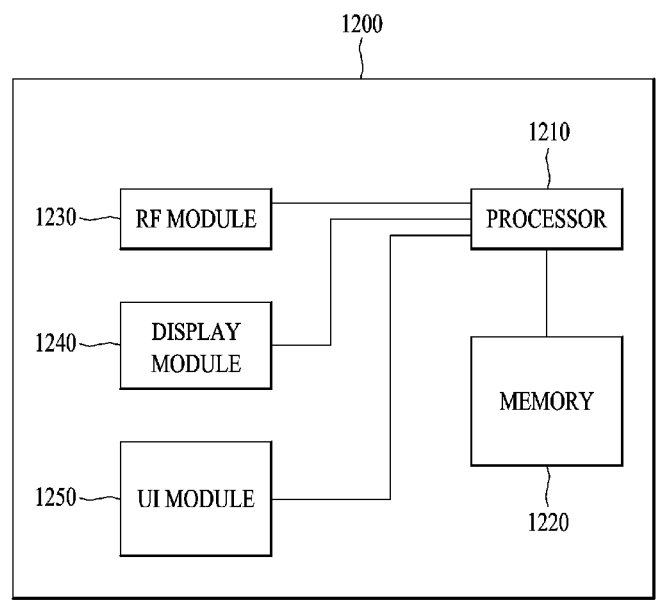
FIG. 12 is a block diagram of a communication apparatus according to an embodiment of the present invention.

Referring to FIG. 12, a communication apparatus 1200 includes a processor 1210, a memory 1220, a Radio Frequency (RF) module 1230, a display module 1240 and a user interface module 1250.

The communication apparatus 1200 is shown for convenience of description and some modules thereof may be omitted. In addition, the communication apparatus 1200 may further include necessary modules. In addition, some modules of the communication apparatus 1200 may be subdivided. The processor 1210 is configured to perform an operation of the embodiment of the present invention described with respect to the drawings. For a detailed description of the operation of the processor 1210, reference may be made to the description associated with FIGS. 1 to 11.

The memory 1220 is connected to the processor 1210 so as to store an operating system, an application, program code, data and the like. The RF module 1230 is connected to the processor 1210 so as to perform a function for converting a baseband signal into a radio signal or converting a radio signal into a baseband signal. The RF module 1230 performs analog conversion, amplification, filtering and frequency up-conversion or inverse processes thereof. The display module 1240 is connected to the processor 1210 so as to display a variety of information. As the display module 1240, although not limited thereto, a well-known device such as a Liquid Crystal Display (LCD), a Light Emitting Diode (LED), or an Organic Light Emitting Diode (OLED) may be used. The user interface module 1250 is connected to the processor 1210 and may be configured by a combination of well-known user interfaces such as a keypad and a touch screen.

The above-described embodiments are proposed by combining constituent components and characteristics of the present invention according to a predetermined format. The individual constituent components or characteristics should be considered to be optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary. Moreover, it will be apparent that some claims referring to specific claims may be combined with other claims referring to the other claims other than the specific claims to constitute the embodiment or add new claims by means of amendment after the application is filed.

In this disclosure, a specific operation explained as performed by a base station may be performed by an upper node of the base station in some cases. In particular, in a network constructed with a plurality of network nodes including a base station, it is apparent that various operations performed for communication with a mobile station can be performed by a base station or other networks except the base station. Herein, a base station may be substituted with such a terminology as a fixed station, a Node B, an eNode B (eNB), an access point (AP) or the like.

The embodiments of the present invention can be implemented by a variety of means, for example, hardware, firmware, software, or a combination thereof. In the case of implementing the present invention by hardware, the present invention can be implemented through application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. The software code may be stored in a memory unit so as to be driven by a processor. The memory unit may be located inside or outside of the processor, so that it can communicate with the aforementioned processor via a variety of well-known parts.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Although the above-described method of receiving a downlink control channel and apparatus therefor are described by focusing on an example of being applied to the 5 G NewRAT system, they are applicable to various kinds of wireless communication systems as well as to the 5 G NewRAT system.

What is claimed is:

1. A method of receiving a downlink control channel by a user equipment in a wireless communication system, the method comprising:
   receiving PDCCH by monitoring candidate Physical Downlink Control Channels (PDCCHs) configured with Control Channel Elements (CCEs) of which number is related to an aggregation level,
   wherein CCEs for candidate PDCCHs of a higher aggregation level include all CCEs for candidate PDCCHs of a lower aggregation level and,
   wherein the CCEs for the candidate PDCCHs of the lower aggregation level included in each of the candidate PDCCHs of the higher aggregation level are determined based on a matrix based on a size of the higher aggregation level and the number of the candidate PDCCHs of the higher aggregation level.

2. The method of claim 1, wherein a size of a row of the matrix is related to the size of the higher aggregation level and wherein a size of a column of the matrix is related to the number of the candidate PDCCHs of the higher aggregation level.

3. The method of claim 2, wherein the CCEs are arranged on each element configuring the matrix with reference to indexes of the CCEs and wherein the CCEs arranged in the same column are included in candidate PDCCH of a same higher aggregation level.

4. The method of claim 1, further comprising:
   indexing CCEs included in a resource set for the PDCCH transmission in a manner of indexing CCEs except CCEs for the candidate PDCCH of the lower aggregation level; and
   determining a remaining CCE except the CCEs for the candidate PDCCHs of the lower aggregation level among the CCEs for the candidate PDCCHs of the higher aggregation level based on indexes of the indexed CCEs.

5. The method of claim 4, wherein an index of the determined remaining CCE is re-indexed with reference to indexes of the CCEs for the candidate PDCCHS of the lower aggregation level.

6. The method of claim 1, wherein based on a case that an index of a start CCE for the candidate PDCCHs of the higher aggregation level is not related to a CCE bundling size for CCE interleaving, CCEs related to indexes resulting from shifting indexes of the determined CCEs for the candidate PDCCHs of the higher aggregation level by a difference of the index of the start CCE in the CCE bundling size are re-determined as CCEs for the candidate PDCCH of the higher aggregation level.

7. The method of claim 1, wherein an interval between the candidate PDCCHs of the higher aggregation level is determined based on a value resulting from dividing the number of the CCEs included in the resource set for the PDCCH transmission by the number of the candidate PDCCHs of the higher aggregation level.

8. A user equipment in receiving a downlink control channel in a wireless communication system, the user equipment comprising:
   a transceiver transceiving a signal with a base station; and
   a processor controlling the transceiver to receive PDCCH by monitoring candidate Physical Downlink Control Channels (PDCCHs) configured with Control Channel Elements (CCEs) of which number is related to an aggregation level,
   wherein CCEs for candidate PDCCHs of a higher aggregation level include all CCEs for candidate PDCCHs of a lower aggregation level and
   wherein the CCEs for the candidate PDCCHs of the lower aggregation level included in each of the candidate PDCCHs of the higher aggregation level are determined based on a matrix based on a size of the higher aggregation level and the number of the candidate PDCCHs of the higher aggregation level.

9. The user equipment of claim 8, wherein a size of a row of the matrix is related to the size of the higher aggregation level and wherein a size of a column of the matrix is related to the number of the candidate PDCCHs of the higher aggregation level.

10. The user equipment of claim 9, wherein the CCEs are arranged on each element configuring the matrix with reference to indexes of the CCEs and wherein the CCEs arranged in the same column are included in candidate PDCCH of a same higher aggregation level.

11. The user equipment of claim 8, further comprising:
   indexing CCEs included in a resource set for the PDCCH transmission in a manner of indexing CCEs except CCEs for the candidate PDCCH of the lower aggregation level; and
   determining a remaining CCE except the CCEs for the candidate PDCCHs of the lower aggregation level among the CCEs for the candidate PDCCHs of the higher aggregation level based on indexes of the indexed CCEs.

12. The user equipment of claim 11, wherein an index of the determined remaining CCE is re-indexed with reference to indexes of the CCEs for the candidate PDCCHS of the lower aggregation level.

13. The user equipment of claim 8, wherein based on a case that an index of a start CCE for the candidate PDCCHs of the higher aggregation level is not related to a CCE bundling size for CCE interleaving, CCEs related to indexes resulting from shifting indexes of the determined CCEs for the candidate PDCCHs of the higher aggregation level by a difference of the index of the start CCE in the CCE bundling size are re-determined as CCEs for the candidate PDCCH of the higher aggregation level.

14. The user equipment of claim 8, wherein an interval between the candidate PDCCHs of the higher aggregation level is determined based on a value resulting from dividing the number of the CCEs included in the resource set for the PDCCH transmission by the number of the candidate PDCCHs of the higher aggregation level.

15. The user equipment of claim 8, wherein the user equipment is capable of communicating with at least one of another user equipment, a user equipment related to an autonomous driving vehicle, the base station or a network.

* * * * *